United States Patent
Cano et al.

(10) Patent No.: US 6,308,307 B1
(45) Date of Patent: Oct. 23, 2001

(54) METHOD FOR POWER ROUTING AND DISTRIBUTION IN AN INTEGRATED CIRCUIT WITH MULTIPLE INTERCONNECT LAYERS

(75) Inventors: Francisco A. Cano; David A. Thomas, both of Missouri City, TX (US); Clive Bittlestone, Los Gatos, CA (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/240,126

(22) Filed: Jan. 29, 1999

Related U.S. Application Data

(60) Provisional application No. 60/073,018, filed on Jan. 29, 1998.

(51) Int. Cl.[7] ................................................. G06F 17/50
(52) U.S. Cl. ........................... 716/8; 716/10; 716/12
(58) Field of Search ........................... 716/1, 2, 10, 12, 716/16, 8, 13

(56) References Cited

U.S. PATENT DOCUMENTS

| | | | |
|---|---|---|---|
| 5,145,800 | * | 9/1992 | Arai et al. ............................... 437/51 |
| 5,459,093 | * | 10/1995 | Kuroda et al. ......................... 437/51 |
| 5,537,328 | * | 7/1996 | Ito ........................................ 364/489 |
| 5,618,744 | * | 4/1997 | Suzuki et al. ......................... 438/599 |
| 6,058,257 | * | 5/2000 | Nojima .................................. 716/12 |

OTHER PUBLICATIONS

Igarashi et al., "A Low–power Design Method Using Multiple Supply Voltages", ACM, pp 36–41, 1997.*

* cited by examiner

*Primary Examiner*—Matthew Smith
*Assistant Examiner*—Leigh Marie Garbowski
(74) *Attorney, Agent, or Firm*—Gerald E. Laws; W. James Brady, III; Frederick J. Telecky, Jr.

(57) ABSTRACT

An integrated circuit 210 has a power grid formed from a first set of power buses 201a and 202a on a metal interconnect level M1, a second set of power buses 203a and 204a on interconnect level M4, and a third set of power buses 205a and 206a on inter-connect level M5. The set of power buses on level M4 are oriented in the same direction as the set of power buses on level M1, and both sets of buses are located coincidentally. A high power logic cell 220 is pre-defined with a set of M1–M4 power vias 221 and 222 so that logic cell 220 can be positioned in a horizontal row unconstrained by pre-positioned M1–M4 power vias. Dummy cell 230 with M1–M4 power vias is positioned as needed so as not to exceed a maximum strapping distance D1. A maximum value for distance D1 is selected based on dynamic power requirements of nearby logic cells 250a–n as determined by simulation. A method for designing and fabricating integrated circuit 210 is described.

22 Claims, 8 Drawing Sheets

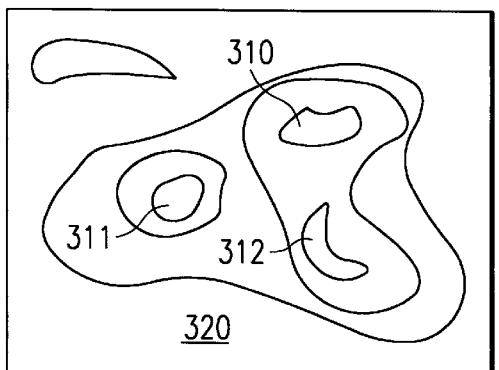
FIG. 7
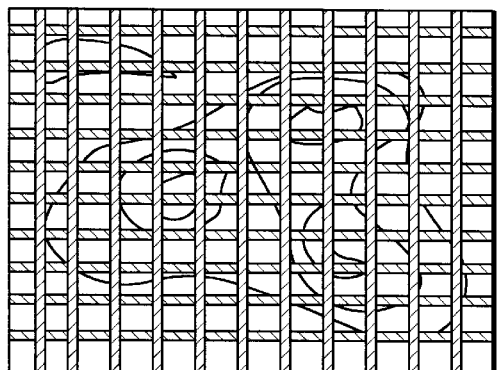
FIG. 8  ▨ METAL3
         ▯ METAL4
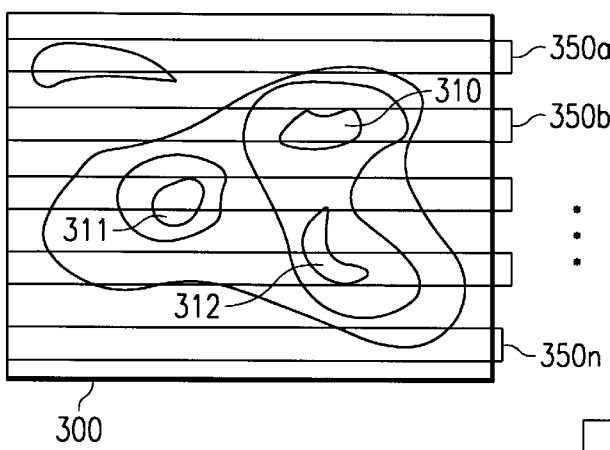
FIG. 9A
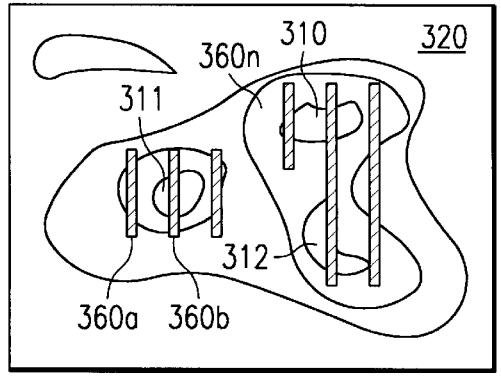
FIG. 9B
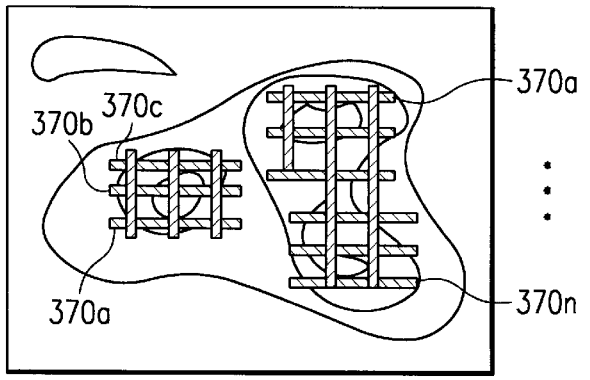
FIG. 9C  ▨ METAL3
          ▯ METAL4

1) EXCEEDED BUILT-IN STRAP SPACING, START REDUCING STRAP DISTANCE.
2A) MIN STRAP SPACING, MOVE TO INCREASED METAL1 WIDTH.
2) RESET STRAP SPACING.
3) EXCEEDED STRAP SPACING LIMIT, START REDUCING STRAP SPACING AGAIN.
4) MIN STRAP SPACING, ADD m3/m4/m5 GRID.

METHOD FOR POWER ROUTING AND DISTRIBUTION IN AN INTEGRATED CIRCUIT WITH MULTIPLE INTERCONNECT LAYERS

This application claims priority under 35 USC §119(e)(1) of Provisional Application Number 60/073,018, filed Jan. 29, 1998.

FIELD OF THE INVENTION

This invention relates to integrated circuits, in particular to integrated circuits that are designed using logic cells selected from a cell library.

BACKGROUND OF THE INVENTION

Within an integrated circuit, complicated circuitry is generally fashioned by interconnecting pre-designed cells that perform simple functions such as logic gates, latches, flip-flops, etc.; or more complex functions such as counters, registers, etc. Each cell must be connected to power and ground, commonly referred to as Vdd and Vss, in order to function.

In order to provide Vdd and Vss throughout the integrated circuit, a power grid is defined which is fashioned from the various levels of conductive interconnects. Since the power grid is defined prior to laying out the integrated circuit, there are often conflicts in placing the various cells that form the integrated circuit which results in a sub-optimum circuit layout.

An object of the present invention is to provide a dynamic power grid construction methodology that allows optimum placement of the various cells that form an integrated circuit.

Other objects and advantages will be apparent to those of ordinary skill in the art having reference to the following figures and specification.

SUMMARY OF THE INVENTION

In general, and in a form of the present invention a method for designing an integrated circuit which contains a number of high power logic cells, a number of low power logic cells and several interconnect layers is provided. A power grid is defined which has a first set of buses on a first of the interconnect layers and a second set of buses on a second of the interconnect layers. Both sets of buses are oriented horizontally and positioned approximately coincidentally. A layout of the integrated circuit is created by placing low power logic cells and high power logic cells in a horizontal row in such a manner that a position along the row of each low power logic cell and each high power logic cell is not constrained by a pre-positioned power tap within the power grid. Each low power logic cell is connected to a power bus in the first set of buses and each high power logic cell is connected to a power bus in the second set of buses.

In another form of the present invention, a third set of buses is placed on a third of the interconnect layers and oriented in a vertical manner. The third interconnect layer is place on top of the first two interconnect layers and a set of interconnects are formed between the third set of buses and the second set of buses. If there is a conflict between a logic cell and one of these interconnects, the interconnect is deleted.

In another form of the present invention, a fourth and fifth interconnect layer are used for routing signal interconnections between the logic cells. The fourth and fifth interconnect layers are placed between the first and second interconnect layers.

In another form of the present invention, a low power grid is defined which is sufficiently robust to supply power for the set of low power logic cells. A layout of the integrated circuit is created in which all of the logic cells are connected to the low power grid. The integrated circuit design is then simulated to determine dynamic power requirements of each logic cell. A power contour map is formed which represents the location of logic cells which have a high dynamic power requirement. A high power grid is defined which covers high power areas of the integrated circuit and the high power logic cells are connected to the high power grid.

Other embodiments of the present invention will be evident from the description and drawings.

BRIEF DESCRIPTION OF THE DRAWINGS

Other features and advantages of the present invention will become apparent by reference to the following detailed description when considered in conjunction with the accompanying drawings, in which:

FIG. 7 is a dynamic power contour map of an integrated circuit, according to an aspect of the present invention;

FIG. 8 illustrates a power grid which does not take into account dynamic power requirements;

FIGS. 9A–9C illustrate a power grid which does take into account dynamic power requirements, according to an aspect of the present invention;

Corresponding numerals and symbols in the different figures and tables refer to corresponding parts unless otherwise indicated.

DETAILED DESCRIPTION OF THE PREFERRED EMBODIMENTS OF THE INVENTION

Aspects of the present invention include methods for designing and fabricating an integrated circuit. In the following description, specific information is set forth to provide a thorough understanding of the present invention. Well known methods, circuits and devices are included in block diagram form in order not to complicate the description unnecessarily. Moreover, it will be apparent to one skilled in the art that specific details of these blocks are not required in order to practice the present invention.

Figure 1:
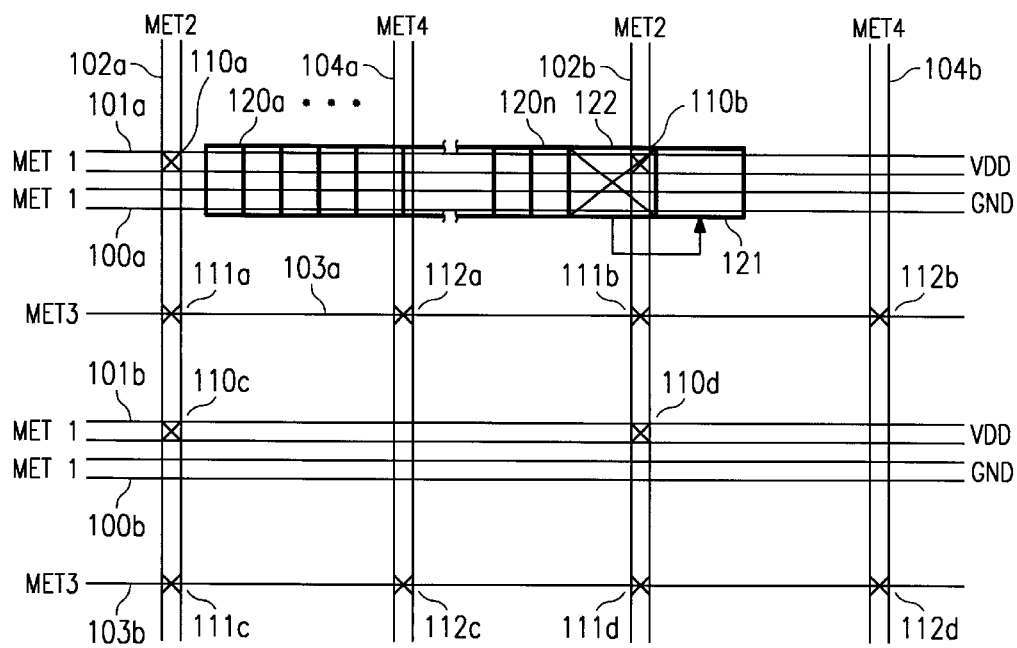
FIG. 1 is an illustration of a prior art power grid which utilizes four metal interconnect layers.

Integrated circuits are now generally designed by selecting pre-designed logic cells from a cell library and interconnecting the selected cells to form a final circuit. The circuit is laid out by positioning each cell in a matrix and interconnecting the logic cells by means of various interconnect layers. A power grid provides power to each logic cell. The power grid is generally defined first, as illustrated in FIG. 1, which is an illustration of a prior art power grid which utilizes four metal interconnect layers. In FIG. 1, power bus lines 100a and 100b are representative of a set of buses 100a–n which are on a first, or level 1, metal interconnect layer and are oriented in a horizontal direction. Likewise, power bus lines 101a and 101b are representative of a set of buses 101a–n which are also on the level 1 metal interconnect layer. Bus lines 101a–n are for a voltage Vdd, while bus lines 100a–n are for ground or Vss. Bus lines 102a and 102b are representative of a set of buses 102a–n on a second, or level 2, metal interconnect layer which are oriented vertically. A set of interconnects, referred to as "vias" are placed in a regular pattern between bus lines 102a–n and bus lines 101a–n as indicated by vias 110a–d. A similar set of level 2 buses and interconnects are provided for Vss. A third set of power buses represented by bus lines 103a and 103b are placed on metal level 3 in a horizontal orientation and a fourth set of power buses represented by bus line 104a and 104b are placed on a metal level 4 in a vertical orientation. A set of vias represented by vias 111a–d interconnect the level 2 bus lines and the level 3 bus lines, while another set of vias represented by vias 112a–d interconnect the level 3 bus lines with the level four bus lines. Thus, a power grid is defined with buses oriented in a "horizontal-vertical-horizontal-vertical" (referred to HVHV) manner. Disadvantageously, the three sets of vias generally restrict placement of logic cells. For example, logic cells 120a–n can be placed as shown under bus lines 100a and 101a. However, logic cell 121 cannot be placed in location 122 because of the presence of via 110b. Therefore, logic cell must be placed as shown and the area within location 122 is essentially wasted. Also, it can be seen that a significant amount of space is required on metal level 2 and metal level three for power buses, which reduces the amount of space available for signal line interconnections between the logic cells.

Figure 2A:
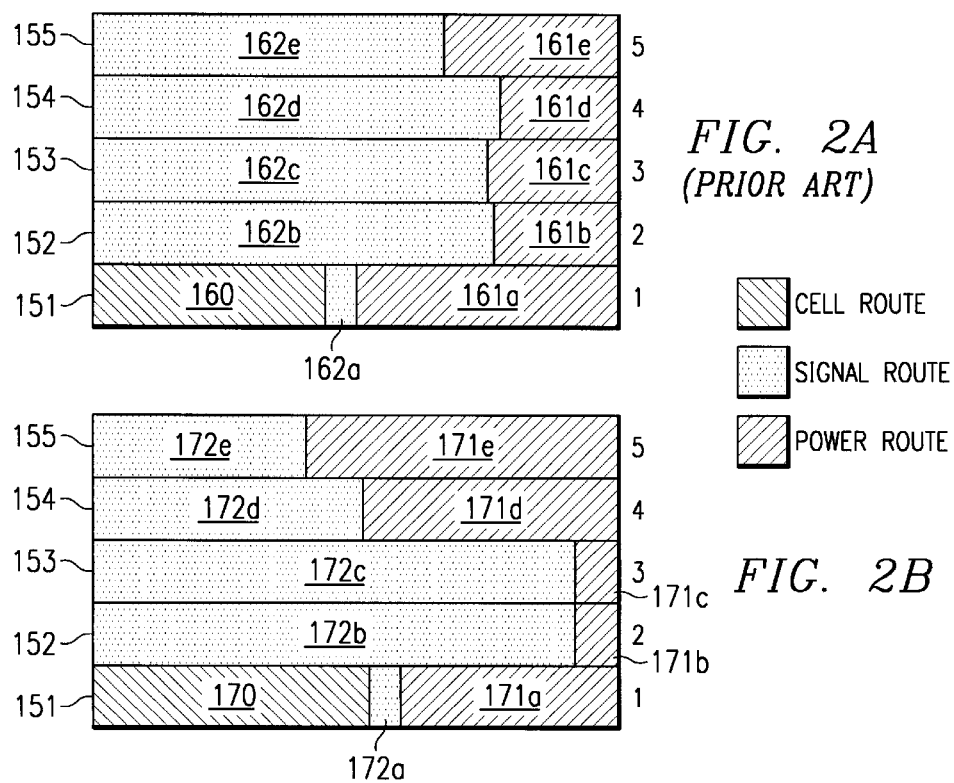
FIG. 2A is a shark tooth diagram of the high power integrated circuit fabricated according to prior art FIG. 1.

FIG. 2A is a shark tooth diagram of the high power integrated circuit fabricated according to prior art FIG. 1. Layers 151–155 correspond to metal level 1 through metal level 5. Shaded area 160 represents a percentage of the total area on level 1 that is used to route signal lines within logic cells. Shaded areas 161a–e represent a percentage of the area on each metal level that is dedicated to power buses. Shaded areas 162a–e represent a percentage of area on each metal level that is available for signal line routing. A significant portion of each metal layer is dedicated to power buses.

Figure 2B:
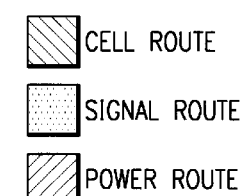
FIG. 2B is a shark tooth diagram of a high power integrated circuit fabricated according to aspects of the present invention.

FIG. 2B is a shark tooth diagram of a high power integrated fabricated according to aspects of the present invention. Layers 151–155 again correspond to metal level 1 through metal level 5. Shaded area 170 represents a percentage of the total area on level 1 that is used to route signal lines within logic cells. Shaded areas 171a–e represent a percentage of the area on each metal level that is dedicated to power buses. Shaded areas 172a–e represent a percentage of area on each metal level that is available for signal line routing. An aspect of the present invention is that only a small percentage of metal level 2 and metal level 3 is needed for power buses, advantageously leaving more room for signal line interconnects on metal layers which are closest to the logic cells.

Figure 3:
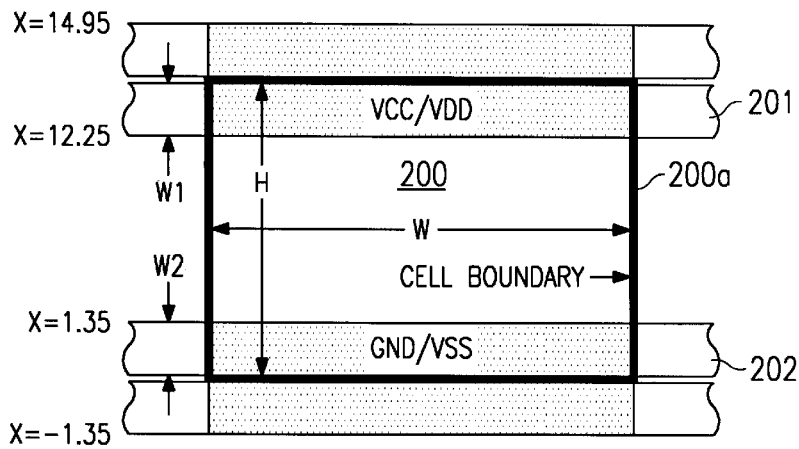
FIG. 3 illustrates a logic cell in relation to the power bus on metal level 1, according to an aspect of the present invention.

FIG. 3 illustrates a logic cell in relation to the power bus on metal level 1, according to the present invention. Power bus line 201 represents one voltage bus, typically referred to as Vdd or Vcc. Power bus line 202 represent a second voltage bus, typically referred to as ground or Vss. Power bus line 201 has a width W1 and power bus line 202 has a width W2. W1 and W2 have approximately the same value. Alternatively, W1 and W2 may have different values in another embodiment. The dark line 200a represent a boundary of a logic cell 200. Various types of logic cells are pre-designed and stored in a cell library. A height H of each cell is a fixed value, for example 13.6 µm. A width W is variable to accommodate a variable number of transistors, depending on the logic function of the logic cell. Within boundary 200a, area on metal layer 1 that is not reserved for power bus lines 201 and 202 can be used for inter-cell signal routing.

Figure 4A:
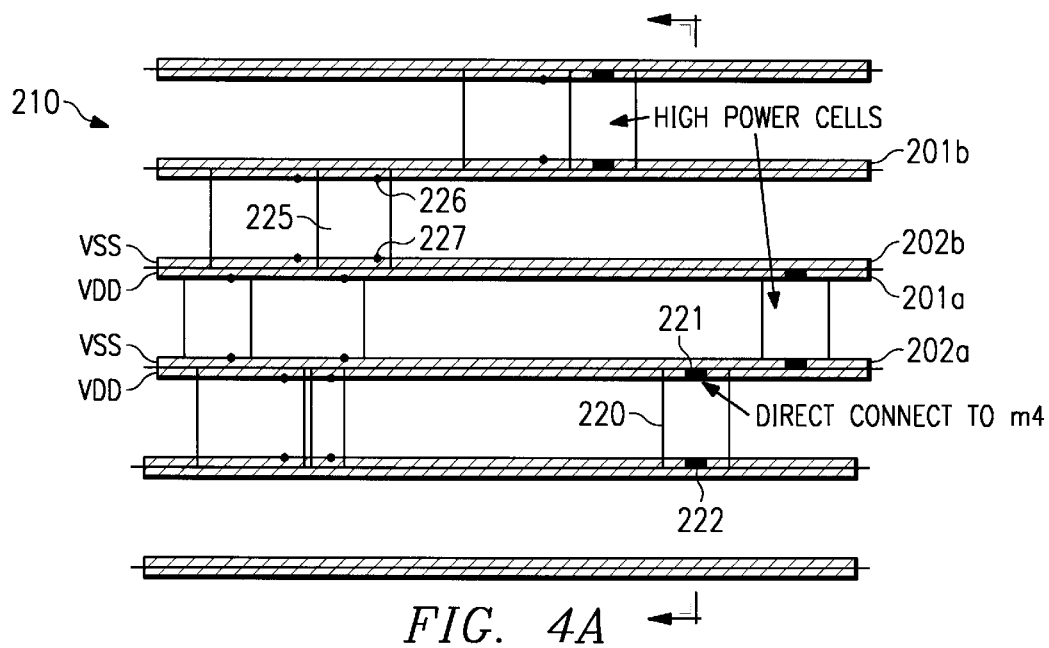
FIGS. 4A and 4B are top and side views of an integrated circuit with five interconnect layers and a power grid according to an aspect of the present invention.
Figure 4B:
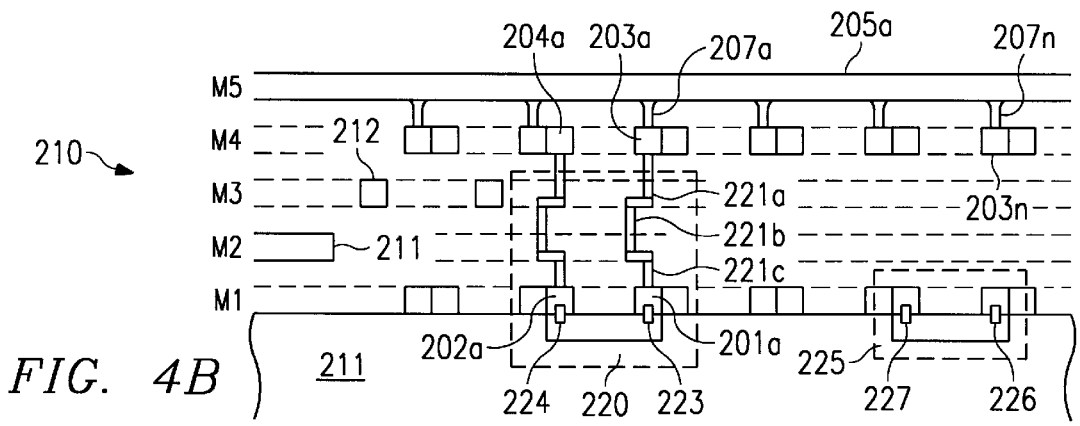

FIGS. 4A and 4B are top and side views of an integrated circuit 210 with five interconnect layers and a power grid formed on top of a substrate 211 according to the present invention. For clarity, FIG. 4A only shows metal layer 1. A set of power buses, of which bus line 201 and 202 are representative, are placed in metal layer 1 in a horizontal orientation. Various low power logic cells, such as logic cell 225 which conforms to the logic cell of FIG. 3, are located in rows aligned with the power bus lines, as described above. Various high power logic cells, such as logic cell 220 which also conforms to the logic cell of FIG. 3, are also located in the rows aligned with the power bus lines. Low power cells, such as low power cell 225, have contacts 226 and 227 which contact power bus lines 201b and 202b, respectively, to provide power to cell 225. Referring to FIG. 4B, high power cells, such as high power cell 220, have contacts 223 and 224 which contact power bus line 201a and 201b, respectively, to provide power to cell 220. According to an aspect of the present invention, high power cell 220 also has a set of M1–M4 power vias 221 and 222 for contacting a second set of power bus lines 203a and 204a which are located on metal layer M4. M1–M4 power via 221 is formed from an M1–M2 vial 221c, an M2–M3 via 221b, and an M3–M4 via 221c and interconnecting metal segments on level M2 and level M3.

Still referring to FIG. 4B, five metal layers are shown as layer M1, layer M2, layer M3, layer M4 and layer M5. Each layer is separated by a layer of insulation. The set of power bus lines, including bus lines 201a and 202a, on layer M1 are oriented in a horizontal manner. According to an aspect of the present invention, the second set of power buses, including bus lines 203a and 204a, on layer M4 are also oriented in a horizontal manner. Furthermore, each bus line on layer M4 is located coincidentally above a corresponding bus line on layer M1, as shown by bus line 203a for voltage Vdd directly above bus line 201a, and bus line 204a for voltage Vss directly above bus line 202a. A third set of power buses on layer M5, including power bus line 207a, are oriented in a vertical manner. A set of M4–M5 power vias, 207a–n interconnect power bus line 205a with each of power bus lines 203a–n. Advantageously, a large percentage of the area of layer M2 and layer M3 can be used for signal line interconnects between the various logic cells, as indicated by signal line 211 on layer M2 and signal line 212 on layer M3. Note that the metal layer orientation stack-up is HVHHV. However, the orientation of layers M2 and M3 are not critical to the present invention. A stack-up of HHVHV can also be used. Furthermore, more than two interconnect layers or less than two interconnect layers can be placed between the first and second set of power buses on layers M1 and M4 without affecting the novel aspects of the present invention.

Figure 5:
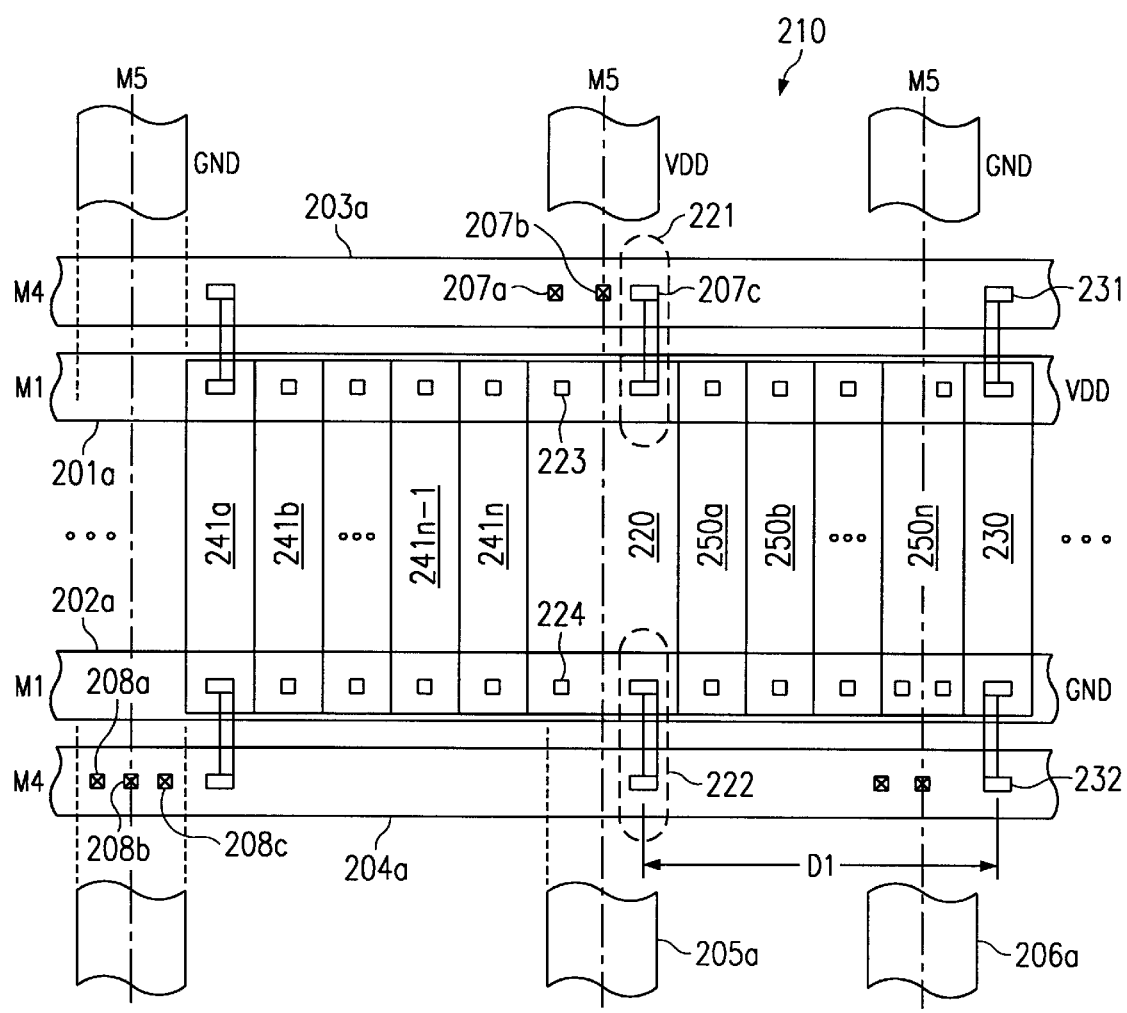
FIG. 5 is a top view of a portion of an integrated circuit which illustrates optimum packing of logic cells, according to an aspect of the present invention.

FIG. 5 is a top view of a portion of integrated circuit 210 which illustrates optimum packing of logic cells, according to an aspect of the present invention. FIG. 5 also illustrates a top view of a portion of the second set of power buses on level M4, and a portion of the third set of power buses on layer M5. Note that while bus line 203a is shown to be adjacent to bus line 201a in FIG. 5, this is for clarity only. Bus lines on layer M4 are coincident with corresponding bus lines on layer M1, as indicated in FIG. 4B. Layer M5 is the top interconnect layer, which allows the set of bus lines on layer M5 to be relatively wide and thick to increase current capacity, since planarization for subsequent layers is not an issue.

Still referring to FIG. 5, a series of logic cells 241a–n are placed in a row corresponding to power bus lines 201a and 202a in a compacted manner so as not to waste area on integrated circuit 210. Logic cell 220 is advantageously placed directly next to logic cell 241n, even though logic cell 220 is in close proximity to vertical bus line 205a. Since there are no pre-positioned power vias between the first set of power buses on layer M1 and the second set of power buses on layer M4, the position of logic cell 220 is not constrained by M1–M4 power vias. Furthermore, since the third set of power buses on level MS are wide, several M4–M5 power vias are located at each power bus signal intersection, as indicated by M4–M5 power vias 208a–c. Advantageously, if there is a conflict between an M4–M5 power via and an M1–M4 power via which is included with a high power logic cell, then one or more M4–M5 vias can be deleted without compromising the integrity of the power grid. This is illustrated by power cell 220 which includes M1–M4 power vias 221 and 222. With a preferred placement of logic cell 220, an interference occurs between power via 221 and an M4–M5 via site 207c. Advantageously, M4–M5 via 207c is deleted so that the placement of high power logic cell 220 is not constrained by a pre-positioned power via within the power grid.

Still referring to FIG. 5, another aspect of the present invention will now be described. It is desirable to position an M1–M4 power via at intervals along power bus lines 202a and 204a, for example, at a distance that does not exceed a certain value for distance D1. Distance D1 is determined so that current flowing in a segment of power bus 202a on level M1 will not cause an excessive voltage drop due to the resistance of that segment of power bus 202a. A maximum value for D1 is also based on parameters for controlling electromigration of metal atoms in the segment of power bus. High power logic cell 220 includes M1–M4 power via 222. As low power logic cells 250a–n do not include an M1–M4 power via, a dummy cell 230 which contains only M1–M4 power vias 231 and 232 is placed so that a maximum value for D1 is not exceeded. The maximum value for D1 is selected based on the average current requirement of low power logic cells, in general. Alternatively, the maximum value for D1 is selected based on the current requirements of low power logic cells 250a–n. Alternatively, the maximum value for D1 is selected based on the current requirements of logic cells on both sides of dummy cell 230. Alternatively, the maximum value for D1 is selected based on the dynamic power requirements of nearby logic cells, as will be described later. Dummy cell 230 requires a minimal area which is only large enough to accommodate vias 231 and 232. Alternatively, dummy cell 230 can be placed coincidentally with a low power logic cell, such as low power logic cell 225 in FIG. 4A in such a manner that contacts 226 and 227 form a portion of M1–M4 power vias 231 and 232 so that no additional area is consumed by dummy cell 230.

Figure 6A:
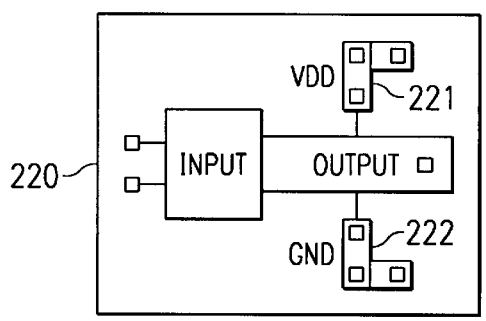
FIGS. 6A and 6B are top views of logic cells used in FIG. 5.
Figure 6B:
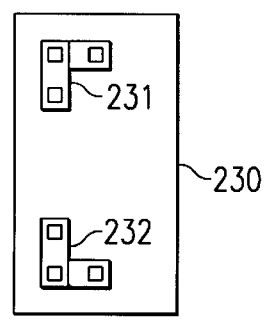

FIGS. 6A and 6B are top views of logic cells used in FIG. 5. FIG. 6A illustrates high power logic cell 220 with M1–M4 power via 221 for Vdd, and M1–M4 power via 222 for Vss. FIG. 6B illustrates dummy cell 230 with M1–M4 power via 231 for Vdd, and M1–M4 power via 232 for Vss.

FIG. 7 is a dynamic power contour map of an integrated circuit 300, according to an aspect of the present invention. At any point in the design process of an integrated circuit, dynamic power requirements of the logic cells comprising the integrated circuit can be determined by a number of simulation methods, such as those in the following list. Each of these methods or techniques has different accuracy and complexity considerations:

1) output load of a logic cell based on load capacitance and average frequency;
2) output load and internal load based on load capacitance and internal cell capacitance and average frequency;
3) output toggle count of a cell;
4) output toggle count and time relationships from back annotated simulation;
5) STA based cell output switch windows for possible simultaneous switching considerations;
6) post placement driver cell load based on Manhattan or global interconnect capacitance and load capacitance and average frequency.

This list is by no means exhaustive or restrictive to the present innovative aspects. The first five technique can easily identify cells that may have high power requirements. With this knowledge, they can be placed in a manner that simplifies the power grid. Alternatively, M1–M4 power vias can be added or deleted from a pre-designed logic cell, or logic cells can be selected based on dynamic power requirements prior to creating a trial layout for the integrated circuit. Method six involves creating a trial layout of the integrated circuit, and then simulating the operation of the circuit using load capacitances which include the capacitance of the signal interconnect lines. With any of the methods, a contour map can be created based on a trial layout and the dynamic power requirements determined by simulation. Such a map for integrated circuit 300 is illustrated in FIG. 7, with high power areas 310, 311, and 312 and low power areas 320, for example.

FIG. 8 illustrates a power grid for integrated circuit 300 which does not take into account dynamic power requirements. Integrated circuit 300 has five levels of metal interconnect, M1–M5. The top most layer M5 contains heavy power busing for power distribution that is not shown for clarity.

Power bus lines on layer M5 or oriented horizontally. A uniform set of high power buses is provided on level M4 in a vertical orientation and a uniform set of high power buses is provided on level M3 in a horizontal orientation. The various buses are interconnected as appropriate at intersections. A uniform set of low power buses is also provided on levels M1 and M2, but not shown.

FIGS. 9A–9C illustrate a power grid for integrated circuit 300 which does take into account dynamic power requirements, according to an aspect of the present invention. FIG. 9A illustrates level M5 with a set of heavy power buses 350a–350n which are selected to support the average power requirements of integrated circuit 300. In this figure, other layers are not shown, for clarity. As with FIG. 8, a uniform set of low power buses is also provided on levels M1 and M2, but not shown, which includes a set of M1–M2 power vias at intersections of the power buses on level M1 and level M2. A set of M2–M5 power vias are placed at intersections of power buses on level M2 and level M5. The low power buses are sufficiently robust to supply power for all low power cells used in integrated circuit 300.

Prior to placing logic cells for integrated circuit 300, high power cells are identified by simulation as described above and instantiated with library cells which have M1–M3 power vias. A trial layout is then created by placing cells as described with reference to FIG. 3. After placement, a second simulation can be performed to determine dynamic power requirements for each cell with regard to additional loading provided by signal line interconnect capacitance, as described above. High power cells are designated based on the simulation results. A power contour map is formed based on the locations of the high power cells and high power areas, such as 310–312 are identified.

FIG. 9B illustrates level M4, with other layers removed for clarity. A set of buses 360a–360n are provided to cover only high power areas 310–312; advantageously, buses 360a–360n are not provided in low power area 320. A set of M4–M5 power vias, not shown, are provided at power bus line intersections of power bus lines on layer M4 and the power bus lines on layer M5.

FIG. 9C illustrates level M3 and M4, with other layers removed for clarity. A set of buses 370a–370n are provided only in high power areas 310–312. A set of M3–M4 power vias, not shown, are provided at power bus line intersections of power bus lines on layer M3 and the power bus lines on layer M4. Power bus lines 370a–370n are placed coincidentally with the power bus lines on layer M1 so that the M1–M3 power vias included in each high power logic cell make contact with one of the power bus lines on layer M3.

Figure 10A:
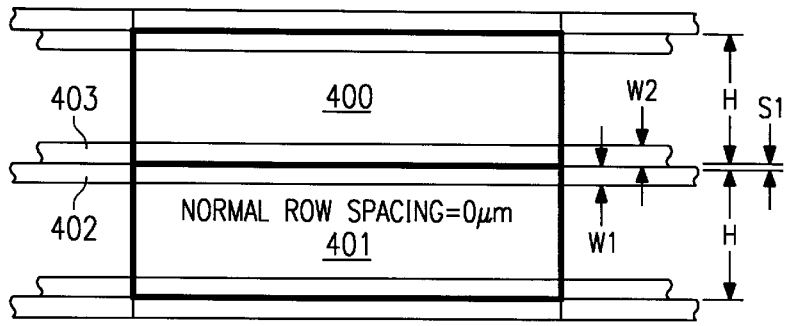
FIGS. 10A–10B illustrate wider row spacing to accommodate wider metal spacing on first level metal in a power grid, according to an aspect of the present invention.
Figure 10B:
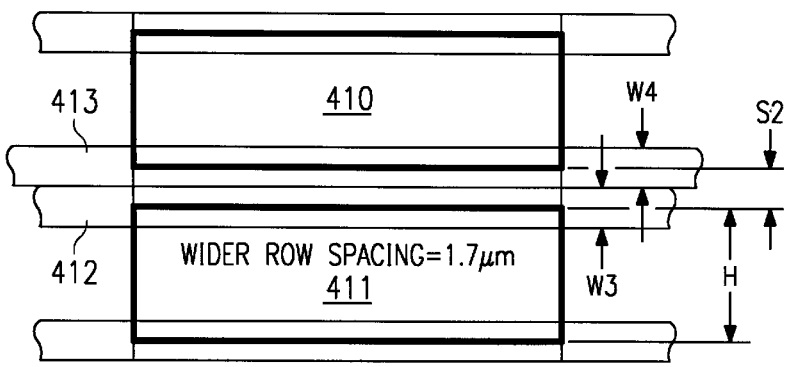

FIGS. 10A–10B illustrate wider row spacing to accommodate wider metal spacing on first level metal in a power grid, according to an aspect of the present invention. FIG. 10A illustrates a portion of an integrated circuit with a row of logic cells 400 and a second row of logic cells 401. Each row of logic cells has a height H, as discussed with reference to FIG. 3. Vdd power bus line 402 has a width W1 and Vss power bus line 403 has a width W2, also as discussed with reference to FIG. 3. Logic cell rows 400 and 401 are placed directly adjacent of each other, such that a row to row spacing S1 has a value of approximately 0. In this embodiment, W1=W2=1.35 $\mu$m and H=13.6 $\mu$m.

FIG. 10B illustrates a portion of a different integrated circuit with a row of logic cells 410 and a second row of logic cells 411. Each row of logic cells has a height H, as discussed with reference to FIG. 3. Vdd power bus line 412 has a width W3 and Vss power bus line 413 has a width W4, which are larger than W1 and W2 of FIG. 10B. This advantageously increases the current capacity of power bus lines 412 and 413. In this embodiment, W3=W4=2.2 $\mu$m. Logic cell rows 410 and 411 are placed apart from of each other, such that row to row spacing S2 has a value of approximately 1.7 $\mu$m to accommodate the wider power bus lines.

Other embodiments can have various values for W3, W4, and S2 according to current requirements of respective logic cells. Also, within a single integrated circuit, power bus line widths can be made different according to different power requirements for different rows of logic cells. Row to row spacing is adjusted to accommodate the power bus widths on a row by row basis.

Figure 11:
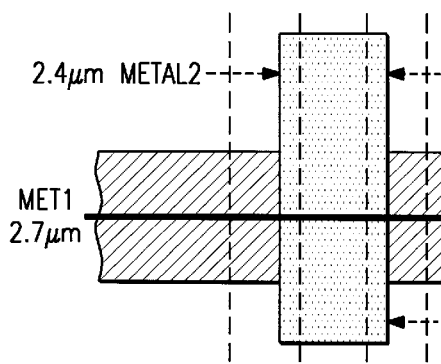
FIG. 11 illustrates variable strap spacing on second level metal, according to an aspect of the present invention.

FIG. 11 illustrates variable strap spacing on second level metal, according to an aspect of the present invention. As discussed with respect to FIGS. 9A–C, a set of power buses on level M2 strap together the set of power buses on level M1, and also interconnect with additional power buses on higher layers, such as layer M5. It has been determined that the distance D2 between power bus lines on layer M2 can be reduced from a preselected value to reduce the length of unstrapped metal on layer M1; thus, effectively reducing the amount of logic cells and current on power bus lines on layer M1 between straps. The preselected value for D2 is 500 $\mu$m as a maximum value. It has been determined that distance D2 can be reduced in stages to as low as 130 $\mu$m before problems with logic cell placement and I/O port access into various logic cells becomes a serious problem. Thus, according to an aspect of the present invention, a complete circuit for an integrated can be simulated to determine dynamic power requirements, and then distance D2 is selected from the range of 130–500 $\mu$m to provide an optimum power grid.

Figure 12:
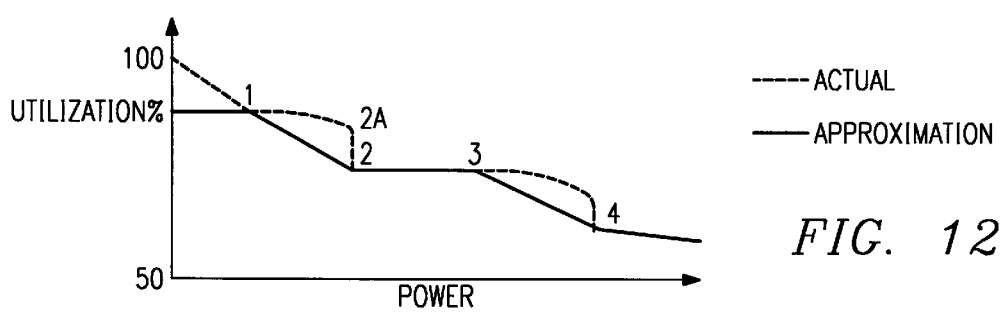
FIG. 12 is a plot of utilization of various types of power grid optimization from FIGS. 10A, 10B and FIG. 11 versus increasing power requirements.

FIG. 12 is a plot of utilization of various types of power grid optimization from FIGS. 5, 9A, 9B, 9C, 10A, 10B and FIG. 11 versus increasing power requirements. After determining the power requirements of a complete integrated circuit, preferably by simulation, the following steps are performed:

step 1: if current requirements would produce unacceptable IR drops in power bus lines on layer M1, reduce spacing D2 of power bus lines on level 2 from 500 $\mu$m to 130 $\mu$m, as needed, as described with reference to FIG. 11, or reduce spacing D1 of M1–M4 power vias;

step 2A: if the minimum strap spacing of 130 $\mu$m is exceeded, then increase the width of the power bus lines on level M1; and step 2B: reset level M2 spacing D1 or D2 to the maximum value of 500 $\mu$m, as described with reference to FIG. 5 and FIGS. 9A–9C;

step 3: if current requirements would still produce unacceptable IR drops in power bus lines on layer M1, reduce spacing D2 of power bus lines on level 2 or spacing D1 of M1–M4 power vias from 500 $\mu$m to 130 $\mu$m, as needed;

step 4: if the minimum strap spacing of 130 $\mu$m is exceeded, then add power bus lines on levels M3 and M4, as discussed with reference to FIGS. 9A–9C.

Figure 13A:
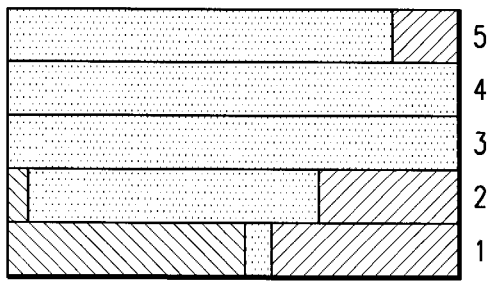
FIGS. 13A–13E are shark tooth diagrams which illustrate the result of utilizing the various power grid optimizations of FIG. 12.

FIGS. 13A–13E are shark tooth diagrams which illustrate the result of utilizing the various power grid optimizations of FIG. 12. FIG. 13A illustrates a low power integrated circuit which has minimal power busing on layer M1 and layer M2.

Figure 13B:
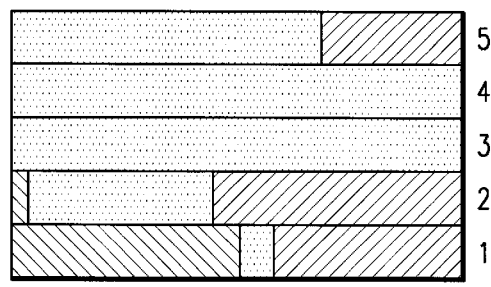

FIG. 13B illustrates a medium low power integrated circuit that is designed using step 1 of FIG. 12.

Figure 13C:
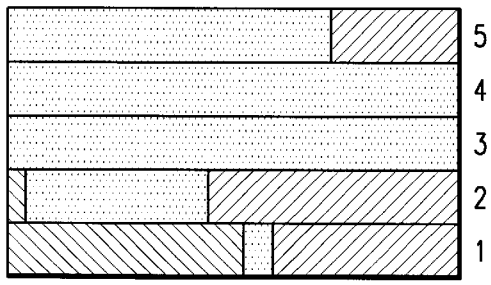

FIG. 13C illustrates a medium power integrated circuit that is designed using step 3 of FIG. 12.

Figure 13D:
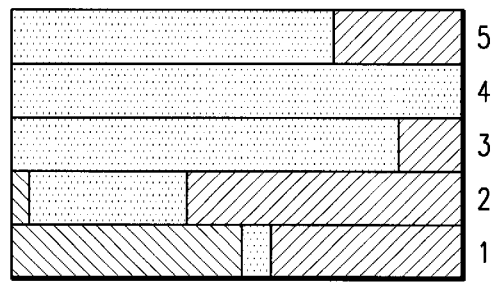
Figure 13E:
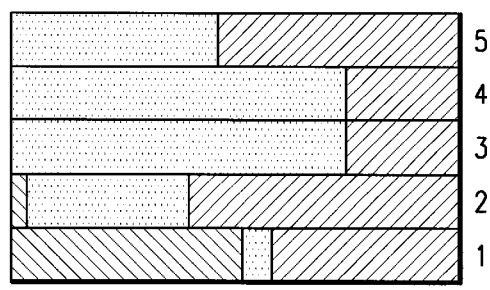

FIG. 13D illustrates a high power integrated circuit that is designed using step 4 of FIG. 12, and FIG. 13E illustrates a very high power integrated circuit that is also designed using step 4 of FIG. 12.

Figure 14:
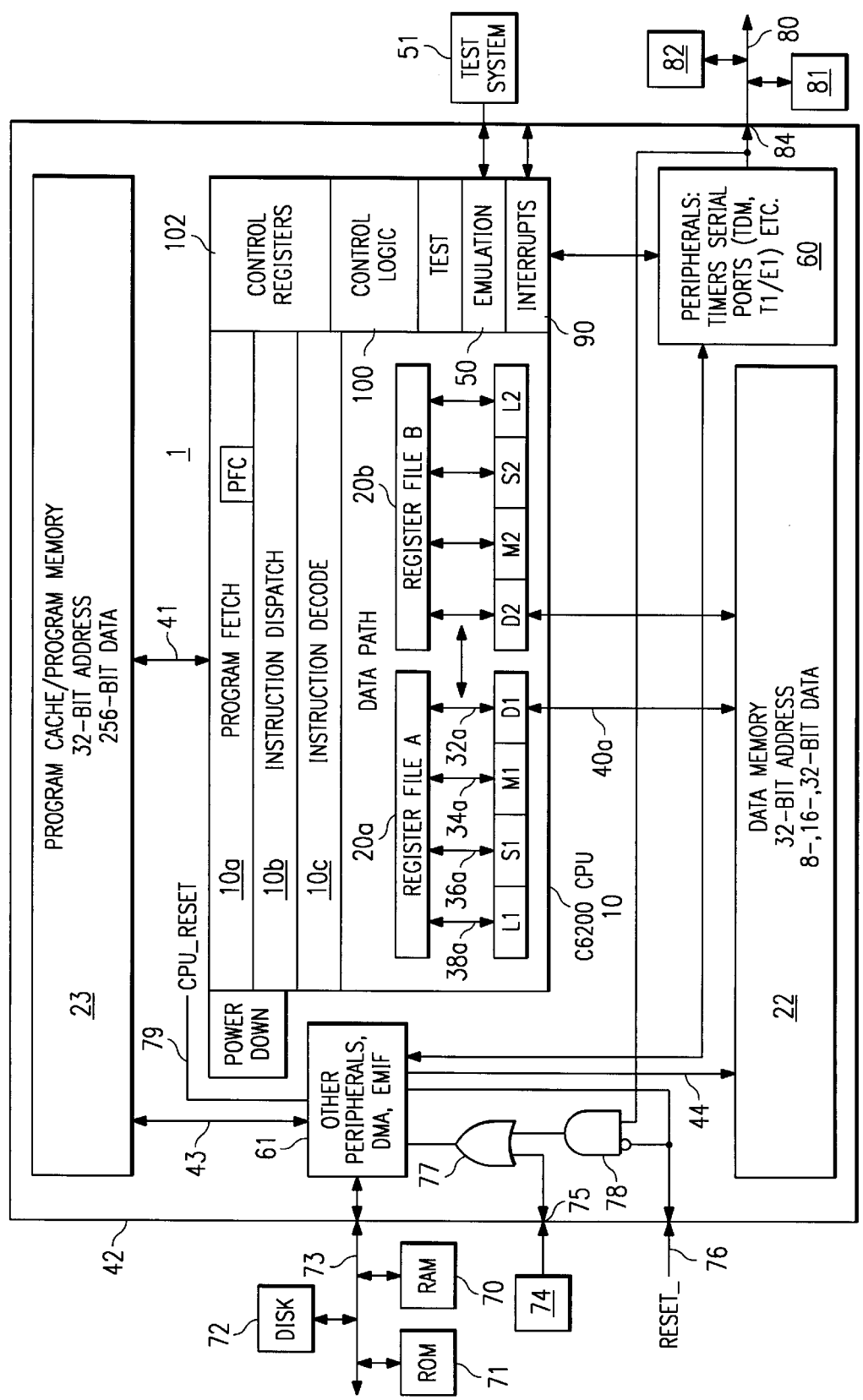
FIG. 14 is a block diagram of an integrated circuit which is designed and fabricated according to aspects of the present invention.

FIG. 14 is a block diagram of an integrated circuit 1 which is designed and fabricated according to aspects of the present invention. In microprocessor 1 there is shown a central processing unit (CPU) 10, data memory 22, program memory 23, peripherals 60 and an external memory interface (EMIF) with a direct memory access (DMA) 61. CPU 10 further has an instruction fetch/decode unit 10a–c, a plurality of execution units, including an arithmetic and load/store unit D1, a multiplier M1, an ALU/shifter unit S1, an arithmetic logic unit ("ALU") L1, a shared multiport register file 20a from which data are read and to which data are written. Decoded instructions are provided from the instruction fetch/decode unit 10c to the functional units D1, M1, S1, and L1 over various sets of control lines which are not shown. Data are provided to/from the register file 20a from/to to load/store units D1 over a first set of busses 32a, to multiplier M1 over a second set of busses 34a, to ALU/shifter unit S1 over a third set of busses 36a and to ALU L1 over a fourth set of busses 38a. Data are provided to/from the memory 22 from/to the load/store units D1 via a fifth set of busses 40a. Note that the entire data path described above is duplicated with register file 20b and execution units D2, M2, S2, and L2. Instructions are fetched by fetch unit 10a from instruction memory 23 over a set of busses 41. Emulation circuitry 50 provides access to the internal operation of integrated circuit 1 which can be controlled by an external test/development system (XDS) 51. Test circuitry 52 contains control registers and parallel signature analysis circuitry for testing integrated circuit 1. Microprocessor 1 is described completely in co-assigned patent application Ser. No. 09/012,813 (TI-25311) which is incorporated herein by reference.

Figure 15A:
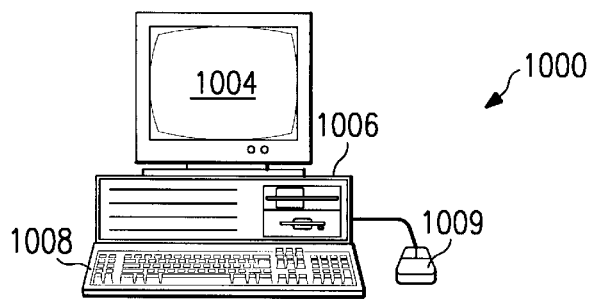
FIG. 15A is an illustration of a computer system which contains a design program incorporating aspects of the present invention.
Figure 15B:
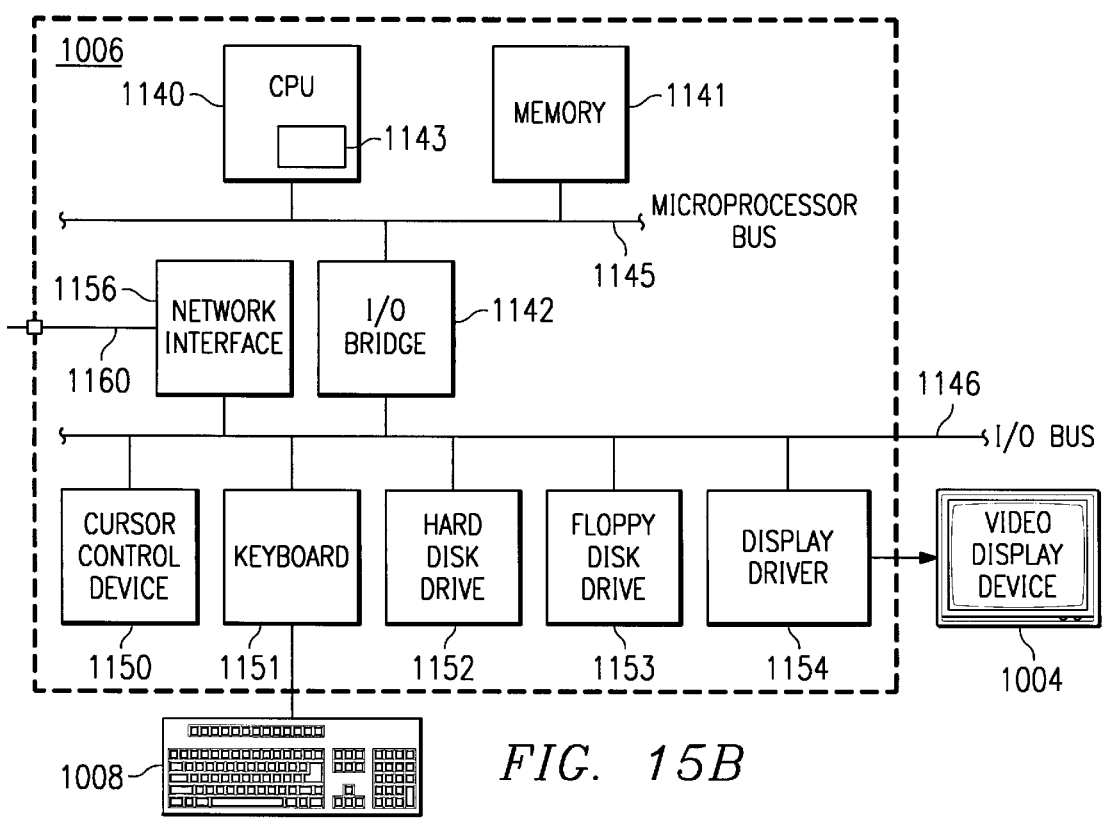
FIG. 15B is a block diagram of the computer of FIG. 15A.

FIG. 15A is an illustration of a computer system 1000 which contains a design program incorporating aspects of the present invention; and FIG. 15B is a block diagram of the computer of FIG. 16A. A design program which contains the steps for designing an integrated circuit using a dynamically constructed power grid according to aspects of the present invention, as described in the previous paragraphs, is stored on hard drive 1152. This design program can be introduced into computer 1000 via a diskette installed in floppy disk drive 1153, or down loaded via network interface 1156, or by other means. The program is transferred to memory 1141 and instructions which comprise the program are executed by processor 1140. A dynamic power grid is defined and can be displayed on monitor 1004. A layout of an integrated circuit is created and displayed on monitor 1004. The design program includes a simulator for determining a power contour map of the integrated circuit.

Once an integrated circuit such as data processing device 1 is designed using the design program on computer system 1000, the integrated circuit is fabricated according to the layout. Fabrication of data processing device 1 involves multiple steps of implanting various amounts of impurities into a semiconductor substrate and diffusing the impurities to selected depths within the substrate to form transistor devices. Masks are formed to control the placement of the impurities. Multiple layers of conductive material and insulative material are deposited and etched to interconnect the various devices. These steps are performed in a clean room environment.

A significant portion of the cost of producing the data processing device involves testing. While in wafer form, individual devices are biased to an operational state and probe tested for basic operational functionality. The wafer is then separated into individual dice which may be sold as bare die or packaged. After packaging, finished parts are biased into an operational state and tested for operational functionality.

An alternative embodiment of the novel aspects of the present invention includes additional power buses for additional voltages on any of layers M1–MS.

Another embodiment of the novel aspects of the present invention provides power buses constructed in a dynamic manner on a portion of an integrated circuit and power buses formed without regard to the novel aspects of the present invention in another portion of the integrated circuit.

In another embodiment, referring to FIG. 4B and FIG. 5, the set of power buses on level M4 are placed offset from the corresponding buses on level M1, but still in a parallel manner.

In another embodiment, referring again to FIG. 4B and FIG. 5, a fourth set of power buses is included on level M3 to accommodate extremely high power requirements.

In another embodiment, referring to FIG. 3, FIG. 4A, FIG. 4B, FIG. 10A and FIG. 10B, power bus lines on level M1 are arranged in an alternating manner so that a space between each row of logic cells can be filled in to form a solid power line. For example, in FIG. 4A, power line 201a is for voltage Vdd. According to this aspect of the present invention, power line 202b is also for voltage Vdd, so that a space between power line 201a and 202b is filled in with conductive material and a single power line is formed. In this embodiment, the position of Vdd and Vss contacts in each logic cell is selected based on which row each logic cell instantiation is placed. For example, in FIG. 10A, if power bus lines 402 and 403 are for voltage Vdd, then logic cells in row 401 have Vdd contacts at the top of the cell with Vss contacts at the bottom of the cell, and logic cells in row 400 have Vdd contacts at the bottom of the cell and Vss contacts at the top of the cell.

An advantage of the present invention is that a power grid for an integrated circuit can be optimized based on dynamic power requirements of the logic cells which form the integrated circuit. By optimizing the power grid, more routing space is available for signal line interconnects so that a complex circuit design can be routed to completion, or the size of the integrated circuit can be reduced.

As used herein, the terms "applied," "connected," and "connection" mean electrically connected, including where additional elements may be in the electrical connection path.

While the invention has been described with reference to illustrative embodiments, this description is not intended to be construed in a limiting sense. Various other embodiments of the invention will be apparent to persons skilled in the art upon reference to this description. It is therefore contemplated that the appended claims will cover any such modifications of the embodiments as fall within the true scope and spirit of the invention.

What is claimed is:

1. A method for fabricating an integrated circuit which contains a plurality of high power logic cells, a plurality of low power logic cells and a plurality of interconnect layers, the method comprising the steps of:

defining a power grid comprising a first plurality of power buses on a first interconnect layer oriented in a horizontal manner and a second plurality of power buses on a second interconnect layer oriented in a horizontal manner, such that the second plurality of buses are positioned approximately coincidentally with the first plurality of buses;

creating a layout of the integrated circuit; and fabricating the integrated circuit according to the layout of the integrated circuit; wherein the step of creating a layout comprises the steps of:

placing a first portion of the plurality of low power logic cells and a first portion of the plurality of high power logic cells in a first horizontal row in such a manner such that a position along the row of each low power logic cell and each high power logic cell is not constrained by a pre-positioned power via within the power grid;

connecting each low power logic cell in the first portion of the plurality of low power logic cells to a first power bus in the first plurality of power buses on the first interconnect layer; and connecting each high power logic cell in the first portion of the plurality of high power logic cells to a second power bus in the second plurality of power buses on the second interconnect layer.

2. The method of claim 1, further comprising selecting the plurality of low power logic cells and the plurality of high power logic cells from a cell library which has a plurality of types of logic cells, comprising at least one high power logic cell template and at least one low power logic cell template, wherein each high power logic cell template includes a power via for connecting to one of the second plurality of power buses on the second interconnect layer.

3. The method of claim 2, wherein the power via within each high power logic cell template also connects to one of the first plurality of power buses on the first interconnect layer.

4. The method of claim 3, further comprising placing a plurality of dummy L1–L2 power via cells selected from the cell library in the first horizontal row to augment the first portion of high power logic cells in such a manner that a pre-selected power via distance is not exceeded.

5. The method of claim 4, wherein at least one of the plurality of dummy L1–L2 power via cells is placed coincidentally over an existing low power logic cell.

6. The method of claim 4, wherein the step of defining a power grid further comprises defining a third plurality of power buses on a third interconnect layer oriented in a vertical manner, wherein the third interconnect layer is placed in a topmost position with regard to the plurality of interconnect layers and interconnected with the second plurality of buses.

7. The method of claim 6, wherein the step of creating a layout further comprises the steps of:

defining a set of L2–L3 power vias which interconnect the third plurality of power buses with the second plurality of buses; and deleting one or more of the set of L2–L3 power vias which interfere with a preferred placement location of the first plurality of high power cells, such that a position along the first row of each low power logic cell and each high power logic cell is not constrained by the set of L2–L3 power vias within the power grid.

8. The method of claim 7, wherein the step of creating a layout further comprises:

routing signal interconnections among the plurality of high power logic cells and the plurality of low power logic cells on a fourth interconnect layer and on a fifth interconnect layer; and locating the fourth interconnect layer and the fifth interconnect layer between the first interconnect layer and the second interconnect layer.

9. A computer system programmed with a method for designing an integrated circuit which contains a plurality of high power logic cells, a plurality of low power logic cells and a plurality of interconnect layers, the method comprising the steps of:

defining a power grid comprising a first plurality of power buses on a first interconnect layer oriented in a horizontal manner and a second plurality of power buses on a second interconnect layer oriented in a horizontal manner, such that the second plurality of buses are positioned approximately coincidentally with the first plurality of buses;

placing a first portion of the plurality of low power logic cells and a first portion of the plurality of high power logic cells in a first horizontal row in such a manner that a position along the row of each low power logic cell and each high power logic cell is not constrained by a pre-positioned power via within the power grid;

connecting each low power logic cell in the first portion of the plurality of low power logic cells to a first power bus in the first plurality of power buses on the first interconnect layer; and connecting each high power logic cell in the first portion of the plurality of high power logic cells to a second power bus in the second plurality of power buses on the second interconnect layer.

10. The method of claim 9, further comprising selecting the plurality of low power logic cells and the plurality of high power logic cells from a cell library which has a plurality of types of logic cells, comprising at least one high power logic cell template and at least one low power logic cell template, wherein each high power logic cell template includes a power via for connecting directly between one of the plurality of power buses on the first interconnect layer and a coincident one of the plurality of power buses on the second interconnect layer.

11. A mass storage device containing a program for a method for designing an integrated circuit which contains a plurality of high power logic cells, a plurality of low power logic cells and a plurality of interconnect layers, the method comprising the steps of:

defining a power grid comprising a first plurality of power buses on a first interconnect layer oriented in a horizontal manner and a second plurality of power buses on a second interconnect layer oriented in a horizontal manner, such that the second plurality of buses are positioned approximately coincidentally with the first plurality of buses;

placing a first portion of the plurality of low power logic cells and a first portion of the plurality of high power logic cells in a first horizontal row in such a manner that a position along the row of each low power logic cell and each high power logic cell is not constrained by a prepositioned power via within the power grid;

connecting each low power logic cell in the first portion of the plurality of low power logic cells to a first power bus in the first plurality of power buses on the first interconnect layer; and connecting each high power logic cell in the first portion of the plurality of high power logic cells to a second power bus in the second plurality of power buses on the second interconnect layer.

12. The method of claim 11, further comprising selecting the plurality of low power logic cells and the plurality of high power logic cells from a cell library which has a plurality of types of logic cells, comprising at least one high power logic cell template and at least one low power logic cell template, wherein each high power logic cell template includes a power via for connecting directly between one of the plurality of power buses on the first interconnect layer and a coincident one of the plurality of power buses on the second interconnect layer.

13. A method for designing an integrated circuit which contains a plurality of high power logic cells, a plurality of low power logic cells and a plurality of interconnect layers, the method comprising the steps of:

defining a power grid comprising a first plurality of power buses on a first interconnect layer oriented in a horizontal manner and a second plurality of power buses on a second interconnect layer oriented in a horizontal manner such that the second plurality of buses are positioned approximately coincidentally with the first plurality of buses;

selecting the plurality of low power logic cells and the plurality of high power logic cells from a cell library which has a plurality of types of logic cells, wherein each high power logic cell includes an L1–L2 power via for connecting directly between one of the plurality of power buses on the first interconnect layer and a coincident one of the plurality of power buses on the second interconnect layer;

placing a first portion of the plurality of low power logic cells and a first portion of the plurality of high power logic cells in a first horizontal row in such a manner that a position along the row of each low power logic cell and each high power logic cell is not constrained by a pre-positioned power via within the power grid;

connecting each low power logic cell in the first portion of the plurality of low power logic cells to a first power bus in the first plurality of power buses on the first interconnect layer; and connecting the L1–L2 power via of each high power logic cell in the first portion of the high power logic cells to the first power bus and to a coincident power bus in the second plurality of power buses on the second interconnect layer.

14. The method of claim 13, further comprising placing a plurality of dummy L1–L2 power via cells selected from the cell library in the first horizontal row to augment the first portion of high power logic cells in such a manner that a pre-selected power via distance is not exceeded.

15. The method of claim 14, wherein at least one of the plurality of dummy L1–L2 power via cells is placed coincidentally over an existing low power logic cell.

16. The method of claim 14, wherein the step of defining a power grid further comprises defining a third plurality of power buses on a third interconnect layer oriented in a vertical manner, wherein the third interconnect layer is placed in a topmost position with regard to the plurality of interconnect layers and interconnected with the second plurality of buses.

17. The method of claim 16, further comprising:

defining a set of L2–L3 power vias which interconnect the third plurality of power buses with the second plurality of buses; and deleting one or more of the set of L2–L3 power vias which interfere with a preferred placement location of the first plurality of high power cells, such that a position along the first row of each low power logic cell and each high power logic cell is not constrained by the set of L2–L3 power vias within the power grid.

18. The method of claim 17, further comprising the steps of:

routing signal interconnections among the plurality of high power logic cells and the plurality of low power logic cells on a fourth interconnect layer and on a fifth interconnect layer; and locating the fourth interconnect layer and the fifth interconnect layer between the first interconnect layer and the second interconnect layer.

19. An integrated circuit, comprising:

a semiconductor substrate with a plurality of lower power logic cells and a plurality of higher power logic cells arranged therein in a plurality of rows oriented in a horizontal manner;

a first interconnect layer disposed over the semiconductor substrate with a first plurality of power buses oriented in a horizontal manner therein, wherein each of the plurality of lower power logic cells has a power terminal connected to the first plurality of power buses and each of the plurality of higher power logic cells has a power terminal connected to the first plurality of power buses;

a second interconnect layer and a third interconnect layer disposed consecutively over the first interconnect layer with signal lines therein interconnecting the plurality of lower power logic cells and the plurality of higher power logic cells;

a fourth interconnect layer disposed over the third interconnect layer with a second plurality of power buses oriented in a horizontal manner therein, such that the second plurality of power buses are positioned approximately coincidentally with the first plurality of power buses; wherein a separate M1–M4 via connecting between one of the first plurality of power buses and a coincident one of the second plurality of power buses is located within the boundary of each of the plurality of higher power logic cells and connected to the power terminal of the respective higher power logic cell; and a fifth interconnect layer disposed over the third interconnect layer with a third plurality of power buses oriented in a vertical manner therein.

20. The integrated circuit of claim 19, wherein a pattern of M4–M5 vias connect each intersection of the second plurality of power buses and the third plurality of power buses, such that an M4–M5 via is omitted from the pattern if it would conflict with an M1–M4 via connected to one of the plurality of higher power logic cells, whereby placement of a higher power logic cell is not constrained by an M4–M5 via.

21. The integrated circuit of claim 20, wherein additional M1–M4 vias are interspersed along each of the plurality of rows and connected between one of the first plurality of power buses and a coincident one of the second plurality of power buses such that a certain distance between each M1–M4 via is not exceeded.

22. The integrated circuit of claim 21, wherein at least one of the additional M1–M4 vias is disposed within the boundary of a lower power logic circuit.

\* \* \* \* \*